(12) United States Patent
Salour

(10) Patent No.: US 8,918,867 B1
(45) Date of Patent: Dec. 23, 2014

(54) INFORMATION SECURITY IMPLEMENTATIONS WITH EXTENDED CAPABILITIES

(75) Inventor: Mehdi Salour, Santa Clara, CA (US)

(73) Assignee: 8x8, Inc., San Jose, CA (US)

( * ) Notice: Subject to any disclaimer, the term of this patent is extended or adjusted under 35 U.S.C. 154(b) by 334 days.

(21) Appl. No.: 13/046,025

(22) Filed: Mar. 11, 2011

Related U.S. Application Data

(60) Provisional application No. 61/313,426, filed on Mar. 12, 2010.

(51) Int. Cl.
*G06F 11/00* (2006.01)

(52) U.S. Cl.
USPC .............................. 726/22; 726/23

(58) Field of Classification Search
None
See application file for complete search history.

(56) References Cited

U.S. PATENT DOCUMENTS

| | | | |
|---|---|---|---|
| 7,937,761 B1 * | 5/2011 | Bennett | 726/23 |
| 2002/0129140 A1 * | 9/2002 | Peled et al. | 709/224 |
| 2004/0128552 A1 * | 7/2004 | Toomey | 713/201 |
| 2008/0083027 A1 * | 4/2008 | Freiman et al. | 726/16 |
| 2008/0155652 A1 * | 6/2008 | DeBie | 726/2 |
| 2008/0263658 A1 * | 10/2008 | Michael et al. | 726/22 |
| 2009/0106835 A1 * | 4/2009 | Corrao et al. | 726/21 |
| 2009/0292930 A1 * | 11/2009 | Marano et al. | 713/189 |
| 2010/0083380 A1 * | 4/2010 | Harris et al. | 726/24 |
| 2010/0132015 A1 * | 5/2010 | Lee et al. | 726/3 |
| 2010/0162347 A1 * | 6/2010 | Barile | 726/1 |
| 2010/0174918 A1 * | 7/2010 | Hoffman et al. | 713/189 |
| 2010/0205665 A1 * | 8/2010 | Komili et al. | 726/12 |
| 2010/0212010 A1 * | 8/2010 | Stringer et al. | 726/22 |
| 2010/0242082 A1 * | 9/2010 | Keene et al. | 726/1 |
| 2010/0242109 A1 * | 9/2010 | Lee | 726/22 |
| 2010/0251369 A1 * | 9/2010 | Grant | 726/23 |
| 2011/0023115 A1 * | 1/2011 | Wright | 726/22 |
| 2011/0083190 A1 * | 4/2011 | Brown et al. | 726/26 |
| 2011/0126281 A1 * | 5/2011 | Ben-Zvi et al. | 726/21 |
| 2011/0145918 A1 * | 6/2011 | Jung et al. | 726/22 |
| 2011/0145926 A1 * | 6/2011 | Dalcher et al. | 726/26 |
| 2011/0239306 A1 * | 9/2011 | Avni et al. | 726/26 |
| 2012/0284516 A1 * | 11/2012 | Errico | 713/168 |

OTHER PUBLICATIONS

Wong Onn Chee. "Information Leakage, Detection, and Prevention." ISSA Journal (Dec. 2007), pp. 37-39.

"Data Loss Prevention Best Practices: Managing Sensitive Data in the Enterprise." Messaging Media Publication, Ironport Systems/Cisco Systems, Inc., P/N 451-0308-1 (Sep. 2007), pp. 1-37.

Justin Peltier. "Symantec Vontu." Symantec Vontu Review, SC Magazine US www.scmagazine.us.com (Oct. 28, 2008), 2 pgs.

* cited by examiner

*Primary Examiner* — Jeffrey Pwu
*Assistant Examiner* — Carlos Amorin
(74) *Attorney, Agent, or Firm* — Crawford Maunu PLLC

(57) ABSTRACT

Systems, devices or methods provide for control of sensitive data in a computer system that includes at least one central server communicatively-coupled to a plurality of client computers. A particular method relates to the execution of software code on the at least one central server to monitor data communications of the plurality of client computers for sensitive data. A subset of the data communications is restricted when sensitive data is detected. Configuration data is provided to each of the plurality of client computers. Software code is executed on each of the plurality of client computers to detect accesses to sensitive data by one or more applications running on a client computer. Actions of the one or more applications running on a client computer are monitored to determine whether or not a trigger event has occurred. In response to determining that the trigger event has occurred, a notification is sent.

22 Claims, 6 Drawing Sheets

INFORMATION SECURITY IMPLEMENTATIONS WITH EXTENDED CAPABILITIES

RELATED DOCUMENTS

This patent document claims the benefit, under 35 U.S.C. §119(e), of U.S. Provisional Patent Application Ser. No. 61/313,426 filed on Mar. 12, 2010, and entitled "Information Security Implementations with Extended Capabilities;" this patent document is fully incorporated herein by reference.

FIELD OF THE INVENTION

The present invention relates generally to information security and to systems, methods and devices for protecting secure information.

BACKGROUND

Significant time, money and computer resources are expended to protect computer networks from external access. Firewalls provide an initial level of intrusion protection that can frustrate both nefarious and valid transactions alike. Some intrusion prevention systems scan data packets for viruses and other content. A significant number of software applications and hardware devices are designed with such protection in mind. These applications have had varying degrees of success in stopping unauthorized intrusion from external sources. Many of the methods and systems are well documented. Intrusion prevention systems, however, are seldom designed to protect from data loss that originates from within the secure network. Comparatively little effort has been undertaken to protect users of a computer network from themselves. With the large amounts of data flowing between systems and the constant communications undertaken by users, it is sometimes lost that a single mistake can expose sensitive data at significant losses, financial and otherwise.

Such data leakage issues, however, represent extremely complex problems that are not easily addressed. The large number of communication protocols (e.g., instant messaging (IM), webmail, Hypertext Transfer Protocol (HTTP), Real-time Transport Protocol (RTP) and File Transport Protocol (FTP)) and everyday use of communications, such as email, complicate the problem. Any one of the various communication protocols can be used to disseminate sensitive data. Moreover, the dissemination is often accidental, thereby resulting in leakage from even trusted employees/users.

A comprehensive security system that includes aspects capable of addressing these and other issues is discussed herein.

SUMMARY

Aspects of the present disclosure are directed to information security implementations that address challenges including those discussed above, and that are applicable to a variety of computer applications, devices, systems and methods. These and other aspects of the present invention are exemplified in a number of implementations and applications, some of which are shown in the figures and characterized in the claims section that follows.

Embodiments of the present disclosure are directed toward a system, device or method for control of sensitive data in a computer system that includes at least one central server communicatively-coupled to a plurality of client computers. The embodiments include executing software code on the at least one central server to monitor data communications of the plurality of client computers for sensitive data; restrict transmission for a subset of the data communications in response to detecting sensitive data; and provide configuration data to each of the plurality of client computers. The embodiments also include executing software code on each of the plurality of client computers to detect accesses to sensitive data by one or more applications running on a client computer as a function of the configuration data; monitor actions of the detected one or more applications running on a client computer; determine whether or not a trigger event has occurred as a function of a sensitivity level of the sensitive data and the monitored actions; and transmit, in response to determining that the trigger event has occurred, a notification to the central server.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

Figure 1A:
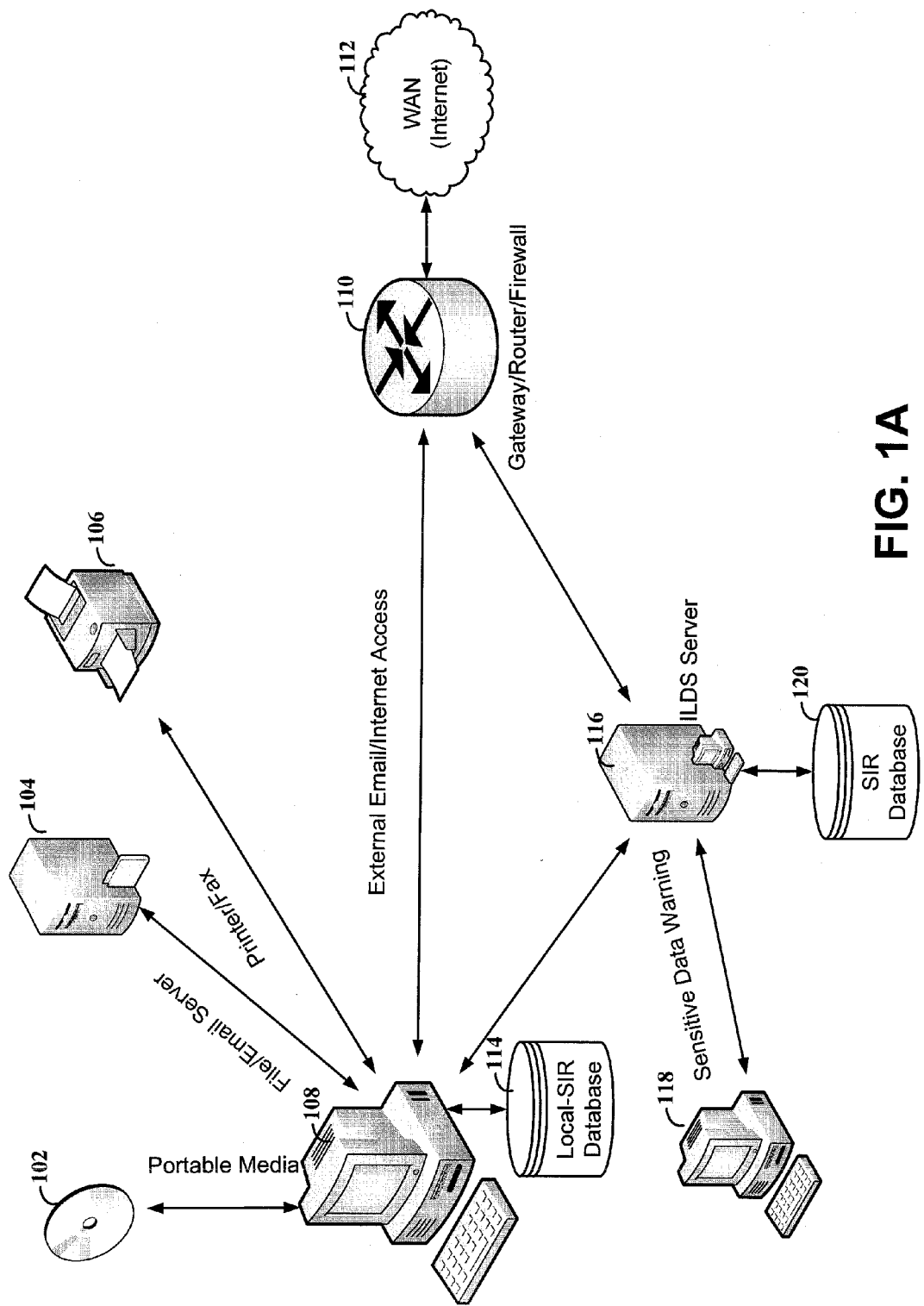
FIG. 1A depicts a security system, consistent with an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure are directed to information security and related approaches, their uses and systems for the same. While the present invention is not necessarily limited to such applications, various aspects of the invention may be appreciated through a discussion of various examples using this context.

Aspects of the present disclosure relate to information security systems. A particular aspect relates to intelligent management of security resources to provide effective and efficient data security. The information system uses a variety of parameters, inputs and learned analysis to target security control to high-risk areas. This can be particularly useful for allowing powerful scanning of specific actions or data that would otherwise not be possible for all data. For instance, the system detects certain actions, data types, applications or other trigger points and responds by implementing heightened security measures.

In a particular implementation, the system includes one or more centralized control points that coordinate with a number of decentralized control points. In an office environment, for instance, employees use computers and other electronic devices that are connected to the office local area network (LAN). These electronic devices may contain or have access to sensitive data. The electronic devices may also have the capability to transmit or otherwise output the sensitive data in an unsecure manner. This can include, as non-limiting examples, access to wide area networks (WANs), portable data storage medium (e.g., portable USB memory devices), email, printers and facsimiles. The electronic devices can be configured with a local application that helps monitor and control activities relating to the electronic devices. One or more centralized devices, such as a control server, can coordinate with the local applications to provide targeted and intelligent security and monitoring of information flow. A number of different coordination techniques are discussed in more detail herein. These techniques can be used alone or in various combinations to provide specifically tailored security solutions.

Aspects of the present disclosure relate to security measures that can be particularly useful for protecting data from misuse by trusted persons and computers, whether or not the misuse is inadvertent or intentional. For instance, the system scans data transmissions to and from computers operated by trusted employees as well as data transmissions involving unknown or otherwise unsecure persons or computers. This helps facilitate implementation of a comprehensive data protection scheme.

Aspects of the present disclosure relate to a method for controlling sensitive data from being accessed by unauthorized persons or computers. One such system includes at least one central server that is communicatively-coupled to a plurality of client computers, e.g., using a LAN. The central server provides coordination functions to the client computers by executing software that provides host-Information Leakage Detection/Prevention System (ILDS) functions. The ILDS provides a monitoring function with regards to various data communications to and from the plurality of client computers. In particular, the communications can be checked for sensitive data. The ILDS has the ability to restrict transmissions for a subset of the data communications in response to detecting sensitive data, but other actions can be taken including, but not limited to, logging the incident and informing users or administrators of the possible information leak. The ILDS helps coordinate the function of the overall system by providing configuration data to the plurality of client computers. The configuration data can include definitions and parameters that are useful for identifying sensitive data. Other aspects of the configuration data can help define trigger events that are used to determine whether or not the system should take appropriate action.

The client computers execute software code, e.g., a local security application that can be used to monitor and assess data leakage risks. The local security application monitors functions of various applications running on the client computers. For instance, the local security application can detect accesses to sensitive data by applications running on a client computer. The configuration data provided by the central server can be used to help assess whether or not particular data is sensitive. The local security applications can also monitor actions that other applications perform. The local security applications determine whether or not a trigger event has occurred based upon a sensitivity level of the sensitive data and the monitored actions. The determination of which actions correspond to trigger events can also be responsive to the configuration data from the central server. The local security applications can then take appropriate action including, but not limited to prompting a user to confirm the action, notifying others of the risk, logging information about the risk and transmitting a notification to the central server.

Consistent with embodiments of the present disclosure, the system identifies potentially sensitive data and flags the data accordingly. For instance, the decentralized devices can individually identify and tag data files according to an assessed risk factor. When the tagged data files are transmitted, a centralized device uses the tags to determine the proper actions, such as the level of scanning desired, event logging of the transmission, notification to a system administrator, delaying or denying the transmission and other actions. Another aspect relates to individual devices detecting suspicious activity and reporting the activity to a centralized monitoring station. The centralized monitoring station can evaluate the reported activity and respond accordingly. Such a model improves scalability of the system as much of the processing cost for analyzing the data can be distributed to the decentralized devices. Thus, the effective analysis power increases as the number of devices increases.

The centralized stations include a number of different components that perform various functions. Data transmission monitoring and control can be carried out at access points to external locations, such as WANs and/or the Internet. For instance, monitoring can be implemented at a gateway or firewall. Internal control of data flow can also be implemented on LANs. For instance, different users/computers can have different access rights. Accordingly, data transfers between users can be monitored to assure that these access rights are not violated. In another instance, data transfers to output devices are monitored. Output devices can include, for example, memory storage devices, printers and facsimile devices.

In connection with the various system models disclosed herein, one or more of the security system components can monitor and identify high-risk actions. Such actions are trigger events which cause an appropriate security response in the system. These event-driven triggers are defined according to the desired security implementations. For instance, email accesses to personal/unsecure accounts can be part of a trigger event. Secure information can be compromised by use of such email accounts for a variety of reasons. Thus, one definable trigger event can include any access to an email account. This, however, might be seen as an overly broad trigger event that is overly burdensome on both users and the security system. Thus, aspects of the present disclosure relate to a trigger-event web that defines not only trigger events but also relationships between trigger events.

In a particular implementation of a trigger-event web, various trigger events are associated with other trigger events. The associations between trigger events define the response of the system. For instance, the existence of a trigger event associated with use of an external email address can be associated with a trigger event that involves the use of a cut and paste clipboard while a sensitive document window is active. This association can define when the system responds and further associations can define how the system responds. For instance, the above example may be responded to by flagging the attachment so that if the email is sent, the attachment will be scanned to verify the email does not contain secure information. In another instance, the existence of certain trigger events can indicate that the security risk is low and little or no action needs to be taken.

One trigger event includes the copying of data files to portable media, such as a universal serial bus (USB) memory device, a compact disk (CD), a digital versatile disk (DVD) or other storage medium. This trigger event can be associated with whether another application is active that has access to sensitive data. Examples of potentially problematic applications include, but are not limited to, file-browsers (e.g., Windows Explorer), document editors (e.g., a word processor), document viewers (e.g., Adobe Acrobat PDF Viewer), webbrowsers, database management/access programs, billing programs and others. Data sent to the portable media can be actively scanned, stored for later review/scanning, reported/ logged for review and/or blocked completely.

For such an application, a list of potentially problematic programs can be used to help determine possible issues. This list can be updated as new applications are developed and maintained accordingly. In a particular implementation, the application list includes problematic programs as well as programs that are classified as safe. Unknown programs absent from the list are thereby classified as unknown and can be part of their own set of trigger events. In a particular implementation, the security system monitors actions of unknown programs to develop a rating for the program. For instance, a program that requests access to shared network drives may be rated as a high risk, whereas a program that only accesses local file storage could be rated as a lower risk.

Output data to printers can be set as another trigger event. The application requesting the printing option can be particularly important to determining the risk of the printing request. Another factor is the content of recently accessed files. The security system can monitor access requests to printer drivers and/or accesses to ports designated for printers. Another implementation uses a master-print driver that handles access to each printer. Accesses to all printers are first handled by the master-print driver before being sent to the appropriate printer driver. A monitoring function can also be performed by a centralized printer server or at each printer using a local interface module. The monitoring function can check that the current print request has been approved by the security system to verify that the security system has not been bypassed. If desired, further scanning, reporting and monitoring functions can be implemented at this point.

Online fax or electronic-fax (e-fax) services allow users to send and receive faxes electronically using an Internet connection rather than directly over standard telephone line connections. When someone sends a fax to an online fax number, the service transmits the message as a graphic file. The use of inbound and/or outbound e-faxes can be used as a trigger event. The security status level can be elevated for users that have recently accessed sensitive data.

Another trigger event involves users taking screenshots of a display screen. Screenshot functionality is often provided by the operating system. For instance, some Microsoft operating systems generate an image file from currently displayed images. This image file can be temporarily stored on the operating system's clip board, from where it can be imported into various software programs. Thus, the offending content can be transferred between applications or converted to an image by copying a screenshot (e.g., by taking a screenshot of a word document).

The system can also set a trigger event for uploading of files and/or images to unsecure locations. The system monitors the traffic to detect when files are being uploaded and also to determine the destination. When the destination is not recognized, not approved, or part of a list of unapproved destinations, the uploading can be a triggering event. The uploading can be implemented using a number of file transfer protocols, such as HTTP, FTP or RTP.

Programs that access video and/or audio content can also result in a trigger event. For instance, confidential meeting information is sometimes stored as video and or audio recording. Moreover, a program or user may attempt to subvert the security by converting data into a video or audio stream. Accordingly, accesses (e.g., creation, storing or uploading) to video or audio content can represent a trigger event. In a similar manner, a trigger event can also be set in response to conversion of renderable text into an image file format, such as jpg or pdf.

Clipboard/cut-and-paste actions can be set as trigger events. For instance, a combination-type trigger can be implemented when sensitive data is being viewed and data is copied to the clipboard.

Encryption and/or compression of (sensitive) data can also trigger heightened security measures. This can be particularly useful because encrypted and/or compressed data is often difficult to scan. Accordingly, the trigger event can allow for proactive verification of the content before a potential problem occurs due to a user attempting to transmit the encrypted/ compressed data.

Another trigger point option relates to transmission of an internal link to external email address. Often companies and other organizations operate an internal file system and/or web-interface that can contain sensitive data. Often this internal file system is not directly accessible from external locations. Nevertheless, the sending of such a link may indicate that other information is also being sent, or that a user is attempting to share sensitive data in an improper manner. The link may also provide an outside user with information regarding the file-structure of the internal system or other information that could be used to gain access thereto.

A set of trigger events can also be set to respond to the installation/running of software. In one implementation, the system can store a set of blacklisted software programs that cause a trigger event. Other implementations allow for the use of an approved software program list and trigger events for software programs not on the approved list. In yet another implementation, unknown software can be characterized by monitoring the actions of the software. For instance, unknown software that attempts to establish connections to external locations may be characterized as requiring a trigger event. Combinations thereof are also possible.

Embodiments of the present invention relate to characterizing software programs. The characterizations can then be used to define one or more trigger events. The security system can monitor which programs access sensitive data and characterize the programs accordingly. This can include developing a record of data stored or transmitted by the programs and assess potential transformation of data into new forms (e.g., from renderable text to image files). This can be particularly useful for protecting against third-party software that an individual may choose to install and use.

One configurable aspect relates to a special use of the trigger points. The security system is designed to perform actions that should result in a trigger event at a particular remote computer. These 'test' trigger events can be used to verify security software is properly running on remote computers. If the remote computer does not respond properly, then the local security application may be improperly configured or even disabled.

Certain aspects of the present disclosure relate to the identification of sensitive data. One mechanism for identifying sensitive data is categorizing the data according to creator and/or user of the data. For instance, data created by an employee that is not afforded access to sensitive information can be categorized as less likely to be sensitive. Once the same data/file has been modified by another employee, such as one that deals extensively with sensitive data, the data can be re-categorized as more likely to be sensitive.

Sensitive data can also be identified by scanning/monitoring specific files or directories. From this monitoring scan parameters can be developed. For instance, the security system can learn what types of information are sensitive by scanning known sensitive files for their content. The system can use the known sensitive data as a training set from which parameters can be determined. Predefined scan parameters are also possible, and can be used alone or in conjunction with learned scan parameters.

Aspects of the present disclosure relate to the prioritization data for scanning (e.g., different levels of scanning). In one instance, the priority is based upon access permissions of source directory or file. For instance, data from a source director that is publically accessible will have a low (or no) scan priority. Data from a source directory having access that is limited to only a few individuals, however, can be given a higher scan priority. The system can also set priorities in response to sender-selected priorities, based upon the identity of the creator/editor of the document, or based upon transmission type (e.g., email) or destination.

Embodiments of the present disclosure are directed towards methods of informing a user of potential issues. The user can be prompted or otherwise alerted to any potential issues. For instance, the security system may suggest that there is problem with an email address as a predictive mechanism to prevent accidental errors. Common errors include accidentally sending to a group of individuals instead of a single individual, misspelling an internal email extension or selecting the wrong contact where there is an ambiguity (e.g., due to incorrect autofill or contact selection for similar names). For instance, the security system can be configured to compare a current destination email with other destination emails from the autofill or contacts to identify possible selection mistakes and have the sender confirm detected risks before sending. The security system is also able to learn trending/group lists of individuals or domain names that are problematic or acceptable. At one level the security system can learn from input from the individuals creating the emails. When the security system prompts the individuals for confirmation, the responses are used to learn which contacts the individuals feel are trusted. At another level, one or more central monitoring points can verify selections made by individuals and approve or disprove various destinations. This security can also be updated or monitored by a central system (e.g., to avoid sending to ex-employees that might not be removed from personal email lists).

Certain destination domain names (e.g., a domain name within the email address: individual@<domain-name.com>) can be viewed as particularly high-risk. Any external domain name may cause a prompt and certain domains may be viewed as especially risky (e.g., public domain names, such as hotmail or gmail).

The security system includes a feature that can require encryption/password protection for data. Configuration settings can determine when the requirement is enforced. For instance, certain types of data may require encryption when sent to any external destination. Other types of data may only require encryption when sent to particularly risky destinations. Varying levels of protection and configuration rules are possible by correlating a list of approved destinations with certain types of data/security levels. This list can be set by an administrator and/or dynamically adjusted by learning acceptable behaviors as discussed in more detail herein.

Another configurable aspect of the security system relates to providing control over document security to the owner of a document containing highly sensitive data. The security system presents options for a user to designate documents according to their contents. In one implementation, the designation is done at the time the document is saved. The document owner can specify how the document is treated by selecting a security level and/or by individually configurable options. For instance, the document owner(s) can designate the document as internal only, thereby causing a trigger event for any actions that may indicate data from the document is being sent outside of the company. Another setting allows the document owner to be notified of any risky access by another. A relatively high security setting can even require the document owner to confirm access before the access is granted. In a particular implementation, the owner-level security control is implemented in a distributed fashion using security programs resident to the individual's remote computers.

For instance, a document owner sets the document security level to internal only. A security application on the document owner's computer tags the document accordingly, and if desired also encrypts/password protects the document. The document owner can also set the document to require notification of access. When other individuals attempt to access the file, a resident security program on their computers reads the tag and identifies the document as requiring notification. As a condition of allowing access, the security program sends a notification informing the document owner that another individual is accessing the document. The resident security program can also block any attempts to send the document contents to an external location and/or require confirmation from the document owner before allowing the document contents to be sent to an external location. Such a distributed control system can be particularly useful for improving the scalability of the system.

In addition to document level control of security settings, security settings can be applied to storage/network locations. For instance, the security system can define security levels for various file folders or directories. Documents saved to these file folders or directories inherit these security levels. Thus, a file folder can be defined as high risk and any documents stored therein will be associated with trigger events accordingly. Moreover, the security system can periodically scan document contents of file folders to learn/associate data content with the appropriate security level. For instance, an appropriate human resources individual may use a highly secure file folder for storage of confidential employee information, such as salary and benefits. The system can scan this folder to learn that spreadsheets containing lists of employees and numbers that may be salary related are potentially sensitive.

Aspects of the present disclosure relate to tiered control over certain types of accesses or transmissions as a function of the data content. For instance, certain types of data may be limited to emails to company employees and/or prevented from copying to portable media, while allowing for printing. Other configurations relate to whether or not certain actions will be logged and/or result in notification of security administrators.

A particular implementation of the present disclosure leverages off of existing viral security programs. Many of these programs are designed to scan stored/transmitted documents to identify nefarious software code, such as viruses, worms and Trojans. These viral security programs can receive update files that contain updates necessary to identify newly-discovered nefarious software code. These viral security programs can employ complex and efficient scan algorithms to protect against nefarious code. A plugin-type software module allows for these security programs to also be updated with sensitive data definitions. Thus, the normal scan procedures for the viral security programs can identify stored content that may contain sensitive data. The overall security system can then tag or otherwise control access to such content. Moreover, the viral security programs may also have the ability to monitor network traffic for sensitive data. The overall security system can periodically provide updated definitions for identification of sensitive data by the viral security programs. This can be particularly useful for extending viral-based scans to include sensitive data definitions.

Various implementations of the security system are directed toward a multiple-level scanning system. A first level of scanning can be implemented in real-time to check data being transmitted over the network. It is not practical, however, to have very complex/thorough scanning algorithms being implemented in real-time. Thus, a second level of scanning can be implemented in an off-line fashion. This second level of scanning can be implemented by redirection of certain content to a highly-secure scanning server. The content can be identified in response to one or more trigger events. One mechanism for redirection involves the encapsulation of transmissions. The encapsulation maintains the underlying transmission protocol/format while allowing for (temporary) redirection to a scanning server. The scanning server scans the data transmission and can deny the transmission if a security problem arises. The encapsulation can be stripped and forwarded on if no problems are detected.

A particular implementation involves encapsulating data packets to include tag data identifying security information, such as a level of risk for the data packet. The encapsulation can also redirect the data pack to a scanning server. The scanning server uses this tag data to determine the appropriate response, such as the level of data scanning to be implemented. The server can then strip the encapsulation and tag data to allow the transmission to complete normally. In a particular implementation, a local program is provided that operates within the network stack layer of the remote computers to implement the encapsulation.

In certain implementations, offline scanning is implemented for certain data content. The security system records/stores the data content for subsequent analysis, while allowing the transmission to complete. Subsequently, the data content is checked for sensitive data. Another variation involves delaying the transmission until scanning is completed (e.g., for email or other slower transmissions). The combination of different scan levels can be implemented in response to associated trigger levels. This is particularly useful for providing varying levels of security and varying levels of intrusiveness (e.g., delays in transmission) to the transmissions.

Encrypted data can be difficult or impossible to scan for the original content. Accordingly, the local security program identifies and/or creates a copy of the data or document before it is encrypted. This copy can then be used to authenticate a subsequent encrypted transmission. For instance, a document is to be uploaded to a website using Secured Sockets Layer (SSL). The document is stored at a particular location from which it is uploaded. The local security program associates the encrypted transmission with the particular location so that a scanning server can check the unencrypted copy without needing to decode the SSL transmission. This can be accomplished by including a directory location for the document within the encapsulation data.

Aspects of the present disclosure also recognize that it is sometimes desirable to provide individuals with remote access to files. For instance, many email servers allow for remote connections, including web-browser enabled interfaces. Other computer systems allow remote access to network resources, such as through the use of a Virtual Private Network (VPN) connection. The security system can be designed to provide a downloadable security application that runs at remote computers. This downloadable security application can track data at remote computers and provide an additional level of security. In one instance, the downloadable application is web-accessible. It can be implemented as a standalone program, or operate as a plugin to a web-browser. The downloadable application is able to receive control information, file-definition updates and other data from a remote server. The downloadable application can also enable encryption and decryption of transferred data. The downloadable application (or the security system in general) can also add a confidential indication to an output data (e.g., email disclaimer or watermark on printout).

Aspects of the present disclosure relate to limitations placed upon actions that software programs can undertake when accessing sensitive data. The security system can lockdown application/editing features to limit access within documents (e.g., cut-and-paste/clipboard limitations, export control or save-as). Certain applications may not be amenable to such limitations due to various application-based limitations. For such applications, the security system can report/log high-risk activities for further review. Additional details of such reporting are provided herein. For example, when a copy/paste/screenshot action is performed, a local client reports to the central system what high-risk files/applications were running on the computer at the time. The central system can then assess the risk based upon the combination of a high-risk task (e.g., a screenshot) and a high-risk file/application open on the computer. Appropriate action can then be undertaken as a function of the determined potential for data leakage.

The system also provides a mechanism for control of content that is difficult to automatically ascertain. Media content, such as image, video or audio data, can be particularly difficult to assess. Thus, attempts to convert text or other data into an image file are closely monitored. In a particular implementation, screenshot data is tagged to indicate a list of programs/documents that were active at the time of screenshot. This tagging can be in addition to or separate from the report from a local client to the central system discussed above. The tag can also indicate a particular application or process that was used to generate, modify and/or transmit the data. Use of optical character recognition (OCR) or other feature detection algorithms can be used to assess the content of an image. Computerized interpretation of images is still often difficult. Accordingly, a copy of the data (e.g., images, audio or otherwise) can be stored for subsequent review by an administrator in response to certain criteria being met.

In response to a trigger event and/or identification of sensitive data, the security system can implement additional protection of data stored on portable media or other locations deemed as unsecure, such as on remotely-located computers. One additional protection mechanism involves encrypting the files. The security system configures the encryption according to different levels of protection as a function of trigger events, the type of portable medium and the sensitivity of the data. One security level includes password protecting the data. When a user/accessing device attempts to access the encrypted data, the correct password is required.

Another security level requires authorization from the security system, e.g., by requiring that the accessing device be able to communicate with the security system. The security system can then determine whether or not the accessing device should be allowed to decrypt the sensitive data. The security system can then provide a decryption key upon determining that access should be granted. If the access attempt is determined to be from a nefarious source, the security system can revoke all access attempts to the data. In a particular implementation, the security system can attempt to delete the sensitive data from the remote device. This can be accomplished using a program running local to the accessing device. In particular, the local program can be used to decrypt the data if authorized and remove, delete or otherwise render inaccessible the data if not authorized. Access rights can be set as a function of time, such that the decryption rights/keys expire after a set amount of time. The security system can also delete files after expiration.

The security system includes multiple security levels for different output devices, such as printers. This can be particularly useful for prevention of accidental transmission of a document to a shared/remote printer that may be accessible to persons not authorized to view the document content.

A relatively new issue recognized and addressed by embodiments of the security system relates to information being sent/shared using social networking and blogging. The security system can be configured to check for employee-based data sent to facebook/twitter/myspace/blogs. A keyword search can be performed on data sent and media (e.g., images, video and audio) can be delayed, scanned or prohibited depending upon trigger events and other parameters. In certain implementations, the keywords can be dynamically updated by matching the type of business with the information that is to be protected. For instance, the system can be directed toward updatable content (e.g., product listings on website-press releases or client names from sales information) to automatically update search parameters, such as keywords and other lists. Any content destined for such sites can be checked against the keywords and other lists and flagged, blocked or logged in case of a match.

The security system can also be configured to monitor trends, including transmission trends that are independent of content. For instance a sharp increase in volume of accesses/transmissions may indicate that certain information has become publically accessible. A notification can be sent to a system administrator and/or to the author of the accessed content/document. Failed attempts to access rights-restricted information can also be monitored and used to trigger an appropriate response. For instance, such access attempts might indicate that a link or document was sent to the wrong destination or persons.

A powerful tool of the security system relates to the generation of security reports. One or more central servers can generate reports for administrators and individuals as desired. Examples of data in a security report include, but are not limited to, content types identified as high-risk content that has been flagged for further review, denied data access-transmission, sources of corrected mistakes and suggestions for protecting against future data loss. This centralized reporting can be particularly useful for recognizing overall trends and for identifying systematic data security problems. A particular implementation identifies groups of individuals that represent high-risk and suggests training focus areas for these individuals.

Another aspect of the security system allows the remote applications to generate reports for individual users. This allows for easily scalable security systems to be employed. The system allows the content of reports to be controlled by an administrator. Within a framework setup by an administrator, individuals can customize their reports. Examples of data contained within an individual's report include, but are not limited to, mistakes caught by the system, suggested corrective measures, tracking tendencies over time (e.g., to show improvement) and verification that flagged issues are acceptable.

A useful component of the reports is feedback from individuals and administrators. This allows the security system to elicit input from individuals. This input can then be used to adjust the trigger events and responses thereto accordingly.

Turning now to the figures, FIG. 1A depicts a security system consistent with an embodiment of the present disclosure. One or more remote computers 108 exist on a LAN that includes Information Leakage Detection/Prevention System (ILDS) server 116. Remote computers 108 can access (store or transmit) data using a number of different interface mechanisms. For instance, portable media 102 can be used to store and/or read data content. Portable media includes, but is not limited to, Compact Discs (CDs), Digital Versatile Discs (DVDs), flash drives, portable hard disc drives and hand-held computing devices. One or more servers 104 can offer data services, such as file storage or email services. Printers/facsimiles or other output devices 106 provide another potential for data leakage. A gateway 110 allows the remote computers 108 access to an external WAN 112, such as the Internet.

ILDS server 116 works in combination with one or more programs residing on the remote computers 108. The use of local programs is particularly useful for scalability, flexibility and efficiency. For instance, the local programs can offload much of the analysis and scanning from the ILDS server 116. For systems with an extremely high number of remote computers 108, the use of local programs means that the available processing power increases with each additional computer. For instance, the ILDS system can use information from the remote programs to identify particularly problematic/high-risk situations and data. Sensitive data warnings can then be sent to an administrator 118.

The security system can employ ILDS databases 114 and 120. These databases can be used as a reference for identifying sensitive data. The databases can include keywords, locations, document types, specific content and heuristic signatures to look for specific attributes and characteristics. From this information, currently accessed and/or transmitted data can be checked to determine its (probable) risk level. Moreover, the system can scan permanent file storage locations to categorize the risk level of stored data. When the data is subsequently accessed, the predetermined risk level can help determine how to handle the access.

In certain implementations, the client-side security application can be set to use the ILDS database 120 of the central system thereby eliminating the need to synchronize/update a local database. In other implementations, the client-side security application can request updates from (or have updates be pushed from) a central server.

In addition to identification of sensitive data, the ILDS databases can also define a set of rules and parameters for the security system. In particular, embodiments of the present invention define a set of trigger events that when met, define how the security system processes data access requests.

The ILDS databases are particularly useful for providing a simple and efficient mechanism for configuring and updating the security system. Each local ILDS database 114 can receive updates from a central ILDS server 116. Moreover, each local ILDS database can be customized according to local usage. The central ILDS server 116 can control how much customization particular remote computer or remote users thereof are allowed.

The security system can configure ILDS server 116 to perform data monitoring in several different manners. In a first manner, the ILDS server 116 monitors the transmitted data by snooping transmitted data. In another manner, certain transmissions are routed to ILDS server 116 for review and control thereof. This can be accomplished by encapsulating transmission so that the data is, at least temporarily, routed to the ILDS server. The ILDS server can make a determination whether or not to complete the transmission, e.g., by stripping the encapsulation and allowing the transmission to complete.

Figure 1B:
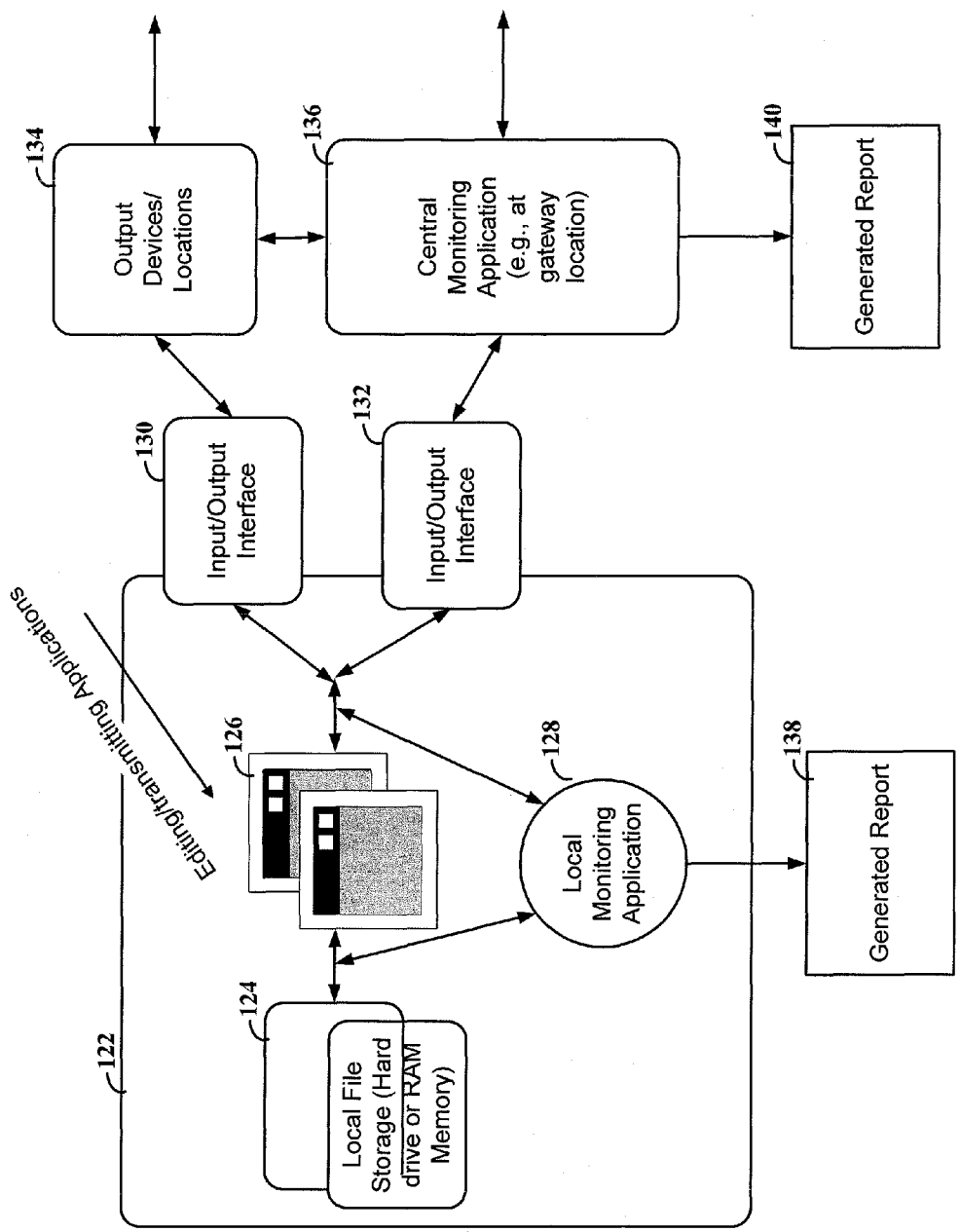
FIG. 1B shows a block diagram of a security system, consistent with an embodiment of the present disclosure.

FIG. 1B shows a block diagram of a security system, consistent with an embodiment of the present disclosure. Block 122 represents a remote computer system that includes local file storage unit(s) 124. The local file storage 124 can include hard disc drive memory, flash memory, and random-access memory among other storage units. A number of data editing and/or transmitting applications 126 reside and are run on computer 108. These applications can include, but are not limited to, word processing applications, image editors, web-browsers, audio recorders and operating system services. Input/output (I/O) interfaces 130, 132 are used by applications 126 to transmit and/or receive data from external sources. I/O interface 130 is able to communicate directly with output devices/locations 134. These devices can include local printers, file server locations and other (relatively) trusted locations. Data can also be routed to I/O interface 132 where a remote monitoring application 136 checks the data. The decision on whether or not remote monitoring application 136 is necessary can be made as a function of trigger events and associated rules. If the trigger event indicates a high-risk activity, then monitoring application 136 is more likely to be invoked.

In a particular implementation, local monitoring application 128 snoops/monitors accesses to file storage locations 124 by applications 126. The monitoring can be implemented as a function of the file location, the file content, file type, combinations thereof and other parameters. In response to an application accessing high-risk data content, the local monitoring application can be set to pay particularly close attention to any subsequent data accesses from the application. For instance, the local monitoring application 128 can detect that a particular application accesses a text document containing high-risk data. Should the particular application subsequently try to store or transmit data (e.g., an image file or an encrypted file), the local monitoring application can be set to track the subsequent data and any applications that attempt to access this data. This helps protect against actions that might otherwise bypass security due to a modification of the format of the data. Moreover, it can be useful for identifying combinations of applications that have the potential for problematic security leakage. The security system can store the sequence of program accesses for further review, by one or more of the remote computer user, an administrator or the central monitoring application 136.

For instance, the system could learn that one application receives text data and generates an image that is passed to a second application that transmits the image data to an external location. The system can flag this combination as potentially problematic in reports 138 and/or 140. A user and/or administrator can then review this information to assess the security risk-level. Software applications are continually evolving and being updated. The security system can therefore be particularly useful for dynamically learning new configurations and the nuances of particular computer systems.

The tracking and monitoring of data can be facilitated through the use of data tags that are added to the transmitted data. For instance, when an application attempts to communicate with an external location, the central monitoring application can ascertain the risk level of the data from the tag data. Other information can also be included to help correct or prevent any potential data leakage.

Figure 2:
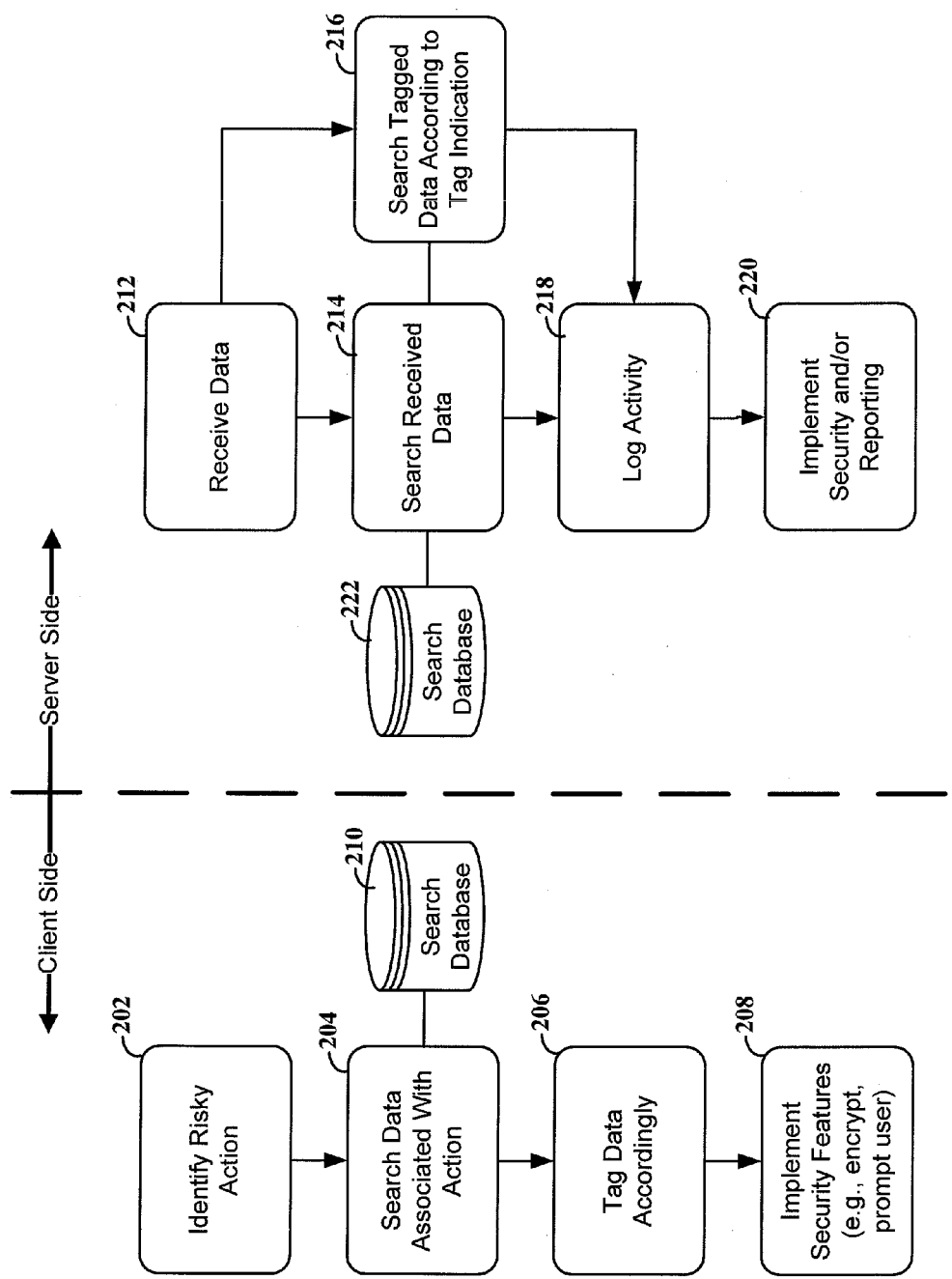
FIG. 2 depicts a flow diagram consistent with a security system, that is consistent with an embodiment of the present disclosure.

FIG. 2 depicts a flow diagram consistent with a security system that is consistent with an embodiment of the present disclosure. The client side represents a flow diagram for actions that can be performed at one or more remote computers. The server side represents actions that can be performed at one or more central/server locations. Step 202 represents the identity of a risky action. Risky actions can be defined according to one or more trigger events. Non-limiting examples include sending data to email groups, uploading files to remote locations, editing sensitive data content, attempts to access restricted data storage locations, inclusion of internal links within external communications, cut-and-paste with sensitive data in an active window and/or print screen and other image generating actions.

In response to identifying risky actions, data that is associated with the risky action can be scanned/searched or otherwise reviewed 204. A search database 210 can include information that is to be searched for and/or searching rule sets to be used. In certain implementations, information resulting from the search 204 is included as a tag associated with the data 206. If necessary, appropriate security actions can then be taken 208. A few example security actions include, but are not limited to, encrypting the data, preventing transmission, prompting the user to confirm, reporting the action to the central server or an administrator and/or saving a copy of the data for subsequent review.

On the server side, data is received 212. This data can be destined for various locations, both internal and external. Received data is scanned 214 for sensitive content. The server can use information in data tags 216 to determine how data is searched or otherwise handled. For instance, all data can undergo a relatively quick and non-intrusive scan; however, a more thorough scan might be prohibitively time consuming to implement on all data. Thus, tag data can be used to identify particularly high-risk data for a through scan and/or other actions. Tag data can also be used to identify particularly low-risk data that either is not scanned at all or is subject to a reduced scan. Thus, the system can intelligently process data according to different scan subsets, which can be further facilitated by individual computer applications tagging data with information that assists in the selection of the scan subsets. The server can log the results of the scan 218 as well as various other activities. The other activities can be stored in the data tags and/or from direct updates from the remote security applications. If necessary, appropriate security and reporting actions can then be taken 220.

Figure 3:
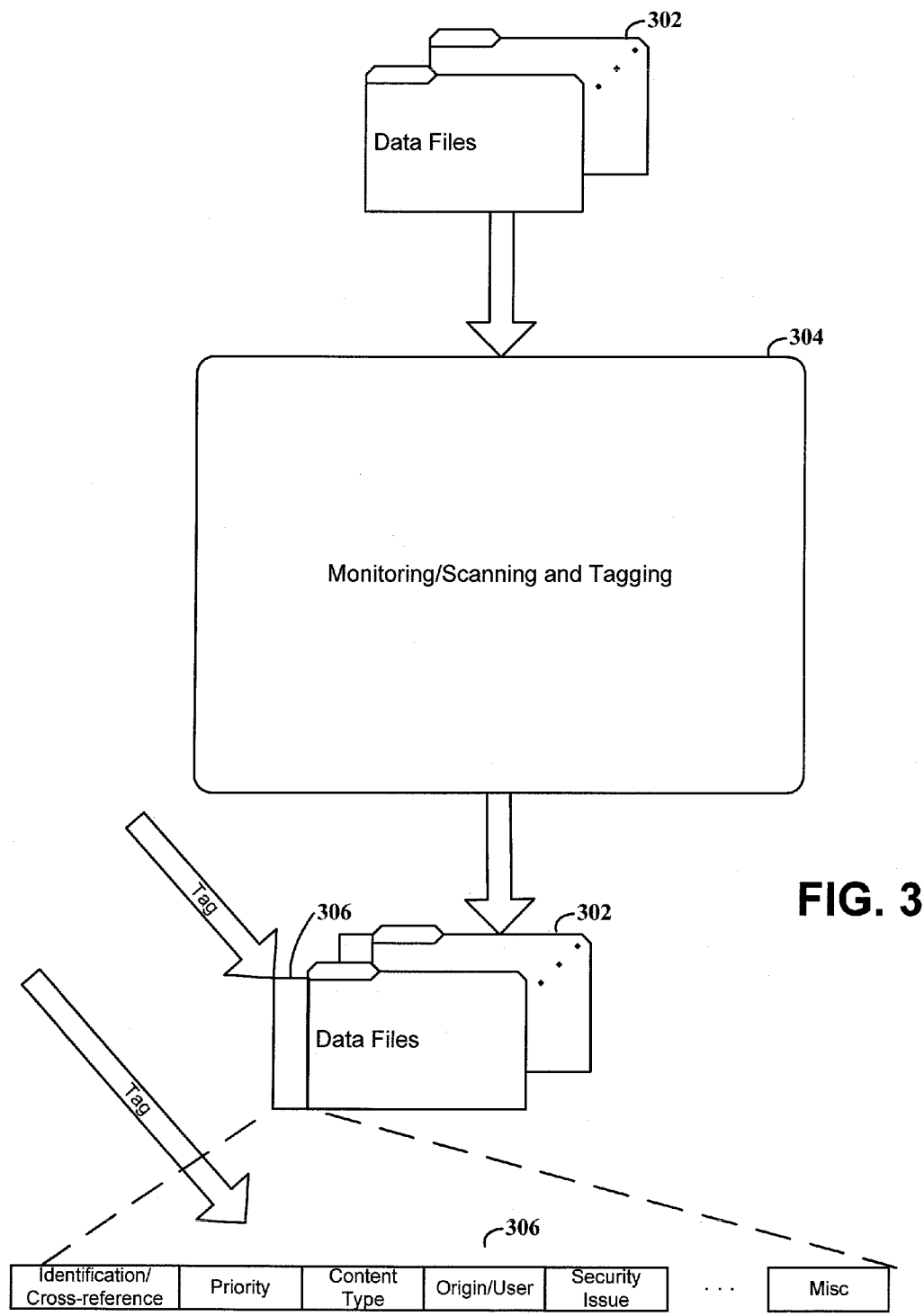
FIG. 3 depicts a diagram of tagging of files/data, consistent with an embodiment of the present disclosure.

FIG. 3 depicts a diagram of tagging of files/data, consistent with an embodiment of the present disclosure. Data files 302 are monitored and scanned 304 by the security system to assess a variety of parameters. A tag 306 is associated with the data files 302 and contains data for classifying the risk of the data files. The various fields depicted for the tag 306 can be correlated to a set of trigger events that help define the appropriate action by the security system. For instance, the depicted tag includes a few example fields that can be used.

The identification/cross-reference field associates transmitted data to a data source file. For instance, this field can include a file path that indicates where an attached document originated for a particular email. This can be useful for a number of different reasons. For instance, some email and other transmission programs use encryption or compression that can make it difficult or impossible to ascertain the contents of the document. Thus, a scanning server can choose to scan the contents of the document located at the indicated file-path. Moreover, as discussed herein, the security system can be configured to generate a copy of the document before it is encrypted or compressed. The identification/cross reference can indicate where to find this copy of the document. In other implementations, the cross-reference can be used to determine the security settings for the storage location from which the document originates. For instance, the security system is able to be configured to define sensitivity levels based upon file-storage locations. Thus, the cross-reference can provide such information by directing the security system to the proper file-storage location.

The tag can also include an indication of priority or risk-level for the associated file. This allows the remote applications to process and evaluate the sensitivity of the data thereby potentially offloading some of the analysis relative to a more centralized model. The priority can be as simple as a rating range (e.g., from 1 to 100) or can include a coded indication of additional data, such as an indication of which trigger events were detected.

The content type can help direct the security system to perform the proper scanning and analysis of the data. It can indicate, for instance, whether the data is a text document, an image file, a video file, a database file or other file type. This can be particularly useful where a file extension is ambiguous or has been obscured by encryption or compression.

Another field for the tag data is an indication of the particular individual/user that is associated with the data and/or the transmission. This can indicate, among other things, the originator of the data file, the last editor, and/or the user that sent or received the data. For instance, the user can be defined according to a current logged in user and/or by the specific computer.

The security issue flag can be used to indicate that high-levels of security should be performed. For instance, the security system could automatically quarantine any such indicated data until an administrator or other appropriate personnel is able to confirm that the security issue has been addressed. Other varying levels of action can also be undertaken.

The data fields discussed in connection with FIG. 3 and elsewhere in the present disclosure are merely examples of the vast potential of such tagging facilitates and are not meant to be limiting.

Figure 4:
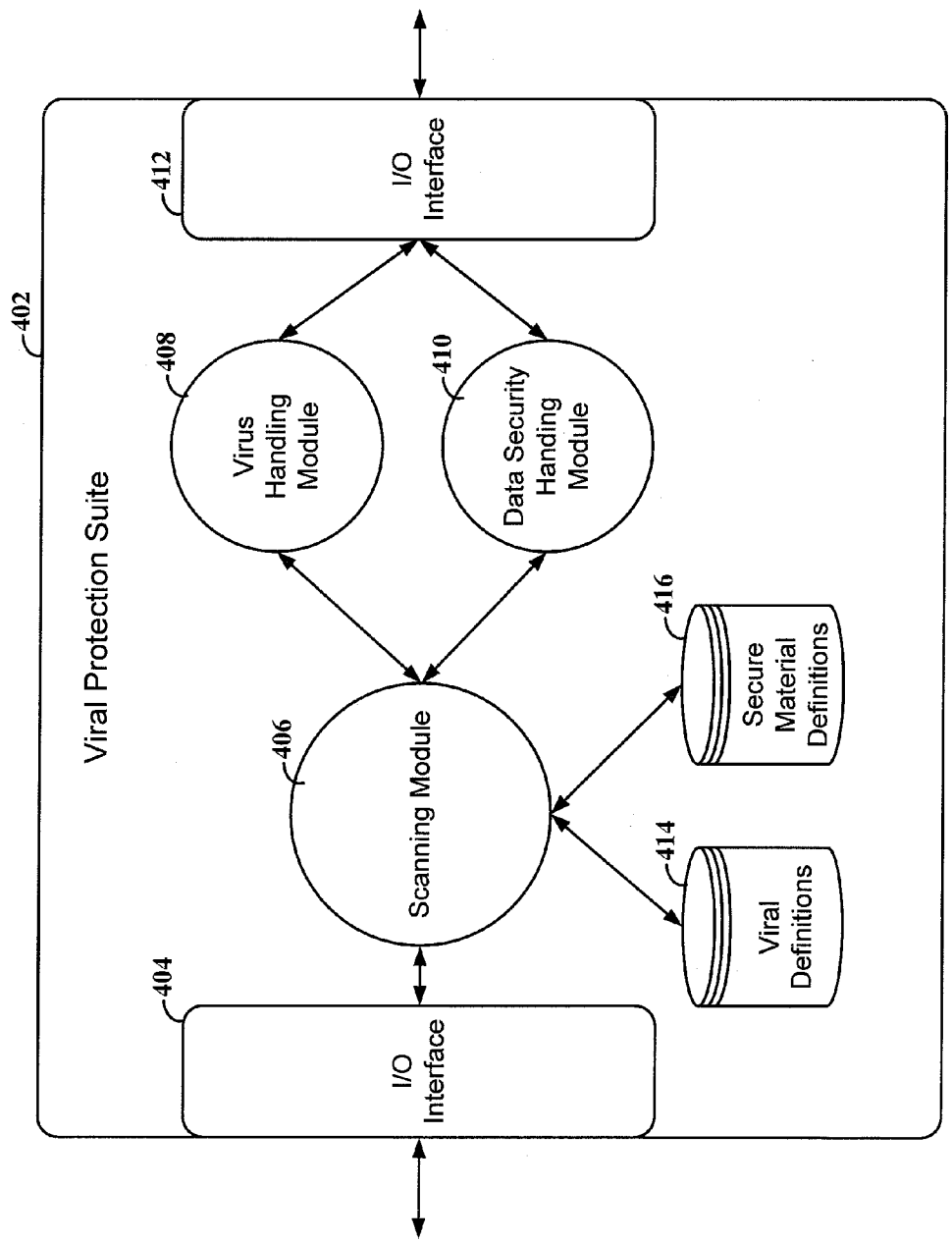
FIG. 4 depicts an example implementation for use with an antivirus program, consistent with an embodiment of the present disclosure.

FIG. 4 depicts an example implementation for use with an antivirus program, consistent with an embodiment of the present disclosure. Aspects of the present disclosure leverage off of existing and future antiviral and malware protection suites. These protection suites 402 offer an existing platform that is designed to perform efficient scanning and data monitoring to detect malicious software code, such as viruses, worms and Trojan programs. Often the protection suites operate using periodically updated virus definition files 414. The scanning software checks files and data transmission against the definition files and takes appropriate action. The security system of the present disclosure includes the option to enable a software module 410 to interface with various protection suites. This module interfaces with the security system to add definitions useful for identifying sensitive/secure data 416.

The scanning module 406 and associated algorithms of the protection suite 402 are then used to check data received on I/O interface 404 against the secure material definitions 416 in addition to the viral definitions 414. If the scanning module 406 detects a match with viral definitions 414, then a virus handling module 408 takes the appropriate action (e.g., deletion or quarantining the offending code using I/O interface 412). If the scanning module 406 detects a match with secure material definitions 416, then data security handling module 410 takes the appropriate action (e.g., tagging the data, prompting a user or logging the event for subsequent action).

Each implementation of a security system can define and adjust the secure material definitions 416 according to the particular needs of each system. For instance, the security system can automatically scan directories designated as secure. The scan identifies content from documents stored in these locations and updates the secure material definitions appropriately. In this manner, the security system dynamically updates itself to account for changing use patterns and different content for each application. Other sources for the secure material definitions are also possible including, but not limited to, manual input and predefined definitions.

Figure 5:
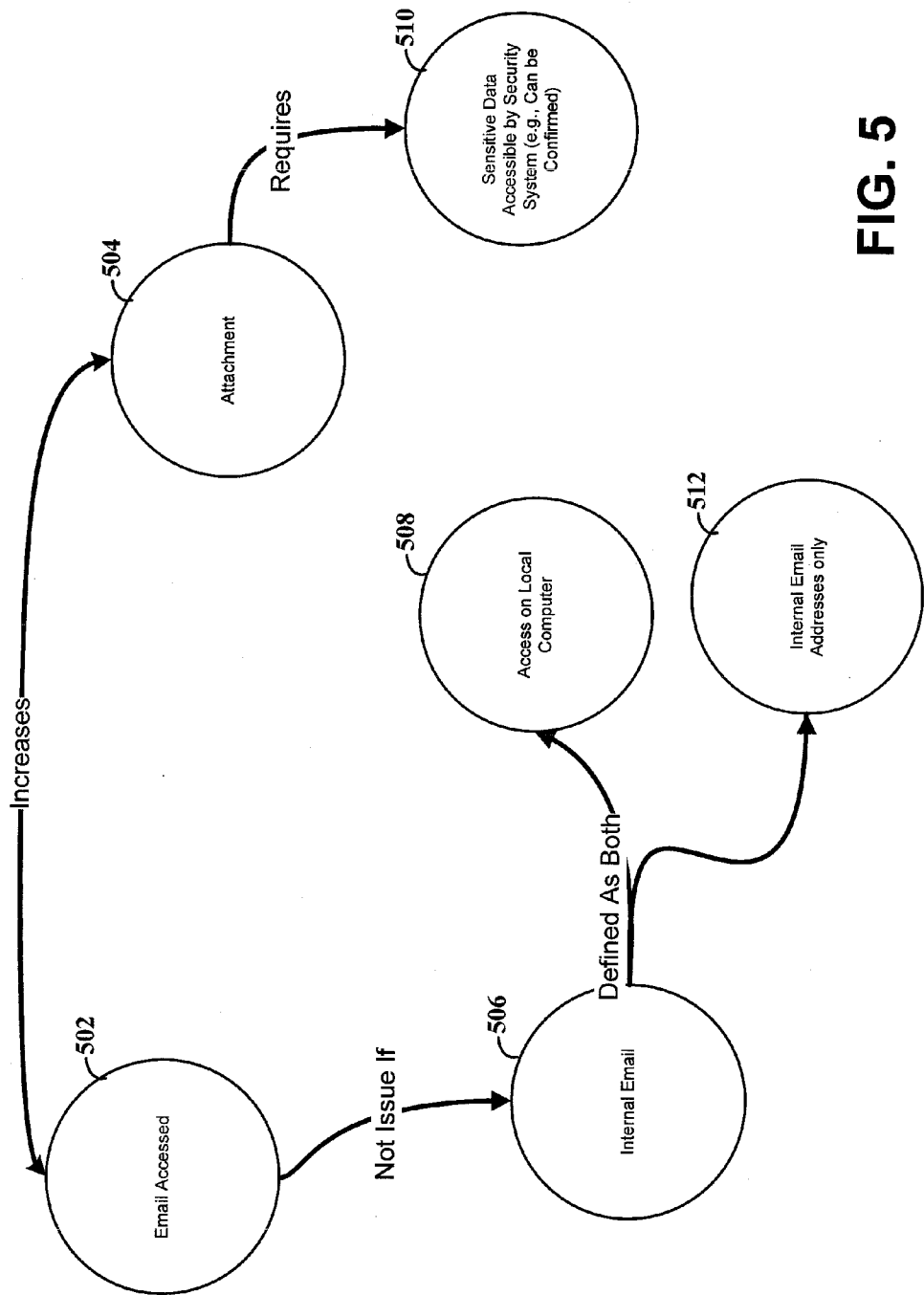
FIG. 5 depicts a graphical depiction of event associations as they may relate to trigger-event web, consistent with an embodiment of the present disclosure.

FIG. 5 depicts a graphical depiction of event associations as they may relate to trigger-event web, consistent with an embodiment of the present disclosure. The various nodes depict possible events. The interconnections define how the events are associated. For instance, event 502 represents access to email, such as attempting to send email using an email client application or over a web interface. The trigger event can be designed such that web access is not an issue in the instances that it is determined to be an internal email 506. Internal email is defined only for situations where the sending access is from a local computer 508 (e.g., a computer located on the company LAN) and all destination addresses are internal to the LAN 512.

If the email is not internal, then the addition of an attachment 504 can increase the sensitivity level. The use of an attachment when sending to an external destination can be considered a (low-level) trigger event. Moreover, an additional trigger event can prevent such action unless the security system has access to the attachment 510.

In a particular implementation, the security system builds a set of events, associations and responses by learning from a particular implementation. For instance, an administrator can setup a set of default rules from which the security system begins to make adjustments as properties of the particular implementation are learned. As an example, the system can detect that new file-locations are added with security levels associated therewith. New events can be added for accesses to this location. Moreover, the data stored in these and other locations can be scanned to identify content to be added to the event list.

User input can also be used to adjust the trigger-event web. For instance, a trigger event that is sometimes overridden by users and other times not, may be poorly defined. The security system searches for features/events that coincide with the user override. The security system then proposes an adjustment to the trigger-event web. This adjustment can either be automatically implemented, or can be confirmed by users or an administrator.

In another implementation, the security system is designed to use training data to learn how to effectively detect sensitive data and/or data leakages. The system applies a learning algorithm to define parameters for detecting sensitive data. This can be done by identifying both sensitive and non-sensitive data/documents. The search/scan parameters can then be defined by assessing how well the sensitive data/documents are identified from non-sensitive documents. This allows for automatic customization for each implementation of the security system. A particularly useful implementation uses this learning aspect with the secure-file location aspect. The security system periodically (or in response to a user request) reassesses the search parameters against the documents currently stored in sensitive file locations. In this manner, the system automatically updates as the sensitive data changes. This reassessment can also be used to update definitions sent to viral protection suites.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiting physical manipulations of physical quantities. These quantities may be stored on a nontransitory storage medium and can be represented by electrical or magnetic signals capable of being stored, transferred, combined, compared, and otherwise manipulated.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, electronic circuits, discrete logic, programmable logic arrays, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus, but can be useful for transforming a computer into a specially designed circuit. Various general purpose systems may be used with programs in accordance with the teachings herein, or it may prove convenient to construct more specialized apparatus to perform the required method. For example, any of the methods according to the present invention can be implemented in hard-wired circuitry or by programming a general-purpose processor.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with a variety of technologies such as those involving home computers, servers, laptops, cellular phones, personal digital assistants, iPhones™, Blackberries™ and the like. The invention may also be implemented using a variety of approaches such as those involving profiling to identify problematic security situations. Such modifications and changes do not depart from the true spirit and scope of the present invention, including that set forth in the following claims.

What is claimed is:

1. A method for control of sensitive data in a computer system that includes at least one central server communicatively-coupled to a plurality of client computers, the method comprising:
   executing a first set of software code on the at least one central server, the first set of software code causing the at least one central server to
      provide configuration data to each of the plurality of client computers, the configuration data including parameters that define criteria for identifying sensitive data and trigger events on the client computers;
      in response to a notification received from one of the plurality of client computers, monitor data communications of the one of the plurality of client computers for sensitive data by reviewing data communications indicated by the notification; and
      restrict transmission for a subset of the reviewed data communications in response to detecting sensitive data; and
   executing a second set of software code on each of the plurality of client computers, the second set of software code causing each of the plurality of client computers to
      identify other applications, running on the client computer, that access sensitive data matching the criteria indicated by the configuration data;
      monitor actions of the other applications identified as accessing sensitive data;
      determine whether or not one of the trigger events, defined by the configuration data, has occurred as a function of a sensitivity level of the sensitive data and the monitored actions; and
      transmit, in response to determining that the trigger event has occurred, the notification to the central server, wherein
   the parameters of the configuration data identify a data file as sensitive based on location of the data file and access permission of the data file.

2. The method of claim 1, wherein the monitored actions of the identified other applications includes copying of data to a clipboard, capturing of a screenshot, accessing a portable medium, accessing a printer, accessing email, and accessing a remote website.

3. The method of claim 1, wherein executing software code on the at least one central server is further configured to:
   designate file storage locations as containing sensitive data;
   scan data content stored at the designated file storage locations; and
   generate the configuration data based upon the scanned data content.

4. The method of claim 1, wherein the configuration data includes sensitive data definitions and wherein executing software code on each of the plurality of client computers is further to use a viral scanning suite to scan files for data content consistent with the sensitive data definitions.

5. The method of claim 1, further including the step of executing software code on each of the plurality of client computers to establish a security setting that a designated user of a respective one of the plurality of client computers confirms before the access thereto is granted.

6. The method of claim 1, wherein the first set of software code on the at least one central server is further configured to verify correct operation of security software on at least one client computer of the plurality of client computers by:
   performing actions to trigger a test trigger event at the client computer; and
   determining whether the at least one client computer transmits a notification indicating the test trigger event has occurred.

7. The method of claim 1, wherein the first set of software code is configured to cause the at least one central server to encrypt and transmit the subset of the reviewed data communications in response to detecting sensitive data.

8. A method for control of sensitive data in a computer system that includes at least one central server communicatively-coupled to a plurality of client computers, the method comprising:
  executing a first set of software code on the at least one central server, the first set of software code causing the at least one central server to
    provide configuration data to each of the plurality of client computers, the configuration data including parameters that define criteria for identifying sensitive data and trigger events on the client computers;
    in response to a notification received from one of the plurality of client computers, monitor data communications of the one of the plurality of client computers for sensitive data by reviewing data communications indicated by the notification; and
    restrict transmission for a subset of the reviewed data communications in response to detecting sensitive data;
  executing a second set of software code on each of the plurality of client computers, the second set of software code causing each of the plurality of client computers to
    identify other applications, running on the client computer, that access sensitive data matching the criteria indicated by the configuration data;
    monitor actions of the other applications identified as accessing sensitive data;
    determine whether or not one of the trigger events, defined by the configuration data, has occurred as a function of a sensitivity level of the sensitive data and the monitored actions; and
    transmit, in response to determining that the trigger event has occurred, the notification to the central server, wherein:
  the notification to the central server includes tagging the sensitive data with information about one or more of the trigger events, the monitored actions and the identified other applications; and
  the first set of software code on the at least one central server is configured to:
    for each of the monitored data communications, assign a scanning priority based on access permissions of the monitored data communications that are indicated in the notification, where data communication of publically available files are assigned a low scanning priority and data communication of restricted files are assigned a high scanning priority; and
    scan the data communications as a function of the assigned scanning priority.

9. A security system comprising:
  a plurality of client computers;
  at least one central server coupled to the plurality of client computers and configured to:
    provide configuration data to each of the plurality of client computers, the configuration data including parameters that define criteria for identifying sensitive data and trigger events on the client computers;
    in response to a notification received from one of the plurality of client computers, monitor data communications of the one of the plurality of client computers for sensitive data by reviewing data communications indicated by the notification; and
    restrict transmission for a subset of the reviewed data communications in response to detecting sensitive data; and
  wherein each of the plurality of client computers is configured and arranged to
    identify other applications, running on the client computer, that access sensitive data matching the criteria indicated by the configuration data;
    monitor actions of the other applications;
    determine whether or not one of the trigger events, defined by the configuration data, has occurred as a function of a sensitivity level of the sensitive data and the monitored actions; and
    transmit, in response to determining that the trigger event has occurred, the notification to the central server, wherein the security system is configured to, in response to the identifying accesses to sensitive data, tag data files including the sensitive data to provide an indication of a risk-level for the data files.

10. The system of claim 9, wherein the central server is configured to use known sets of sensitive and non-sensitive data to apply a learning algorithm that defines parameters for detecting sensitive data.

11. The system of claim 9, wherein the client computers are configured to receive the configuration data as part of a viral definitions file that identifies both sensitive data and potential viruses.

12. The system of claim 9, wherein the central server is configured to scan content of directories designated as secure and to identify sensitive content according to results of the scan.

13. The system of claim 9, wherein:
  the plurality of client computers are configured to process and evaluate the risk-level of the data files according to which trigger events were detected; and
  the data files include a first data file associated with a low risk-level and a second data file associated with a high risk-level.

14. The system of claim 9, wherein a trigger event includes one or more of sending data to email groups, uploading files to remote locations, editing sensitive data content, attempts to access restricted data storage locations, inclusion of internal links within external communications, and cut-and-paste with sensitive data in an active window and print screen.

15. The system of claim 9, wherein the plurality of client computers are configured to detect accesses to sensitive data by applications running on the plurality of client computers.

16. The system of claim 9, wherein the security system is configured to categorize the sensitivity level of data according to a creator and a user of the data.

17. The system of claim 16, wherein the sensitivity level of the data is in response to a level of secure access afforded to the creator and the user of the data.

18. The system of claim 16, wherein the plurality of client computers are configured to tag transmitted data, in response to the transmitted data including sensitive data, and wherein the at least one central server is configured to select from a plurality of scan levels in response to the tag.

19. A method for control of sensitive data in a computer system that includes at least one central server communicatively-coupled to a plurality of client computers, the method comprising:
  executing a first set of software code on the at least one central server, the first set of software code causing the at least one central server to
    provide configuration data to each of the plurality of client computers, the configuration data including parameters that define criteria for identifying sensitive data and trigger events on the client computers;

in response to a notification received from one of the plurality of client computers, monitor data communications of the one of the plurality of client computers for sensitive data by reviewing data communications indicated by the notification; and restrict transmission for a subset of the reviewed data communications in response to detecting sensitive data;

executing a second set of software code on each of the plurality of client computers, the second set of software code causing each of the plurality of client computers to identify other applications, running on the client computer, that access sensitive data matching the criteria indicated by the configuration data;

monitor actions of the other applications identified as accessing sensitive data;

determine whether or not one of the trigger events, defined by the configuration data, has occurred as a function of a sensitivity level of the sensitive data and the monitored actions; and transmit, in response to determining that the trigger event has occurred, the notification to the central server, executing software code on each of the plurality of client computers to establish a security setting that a designated user of a respective one of the plurality of client computers confirms before the access thereto is granted, and further including using security databases as a reference for identifying sensitive data, wherein the databases include keywords, locations, document types, specific content and heuristic signatures to assess and determine a risk level.

20. A method for control of sensitive data in a computer system that includes at least one central server communicatively-coupled to a plurality of client computers, the method comprising:

executing a first set of software code on the at least one central server, the first set of software code causing the at least one central server to provide configuration data to each of the plurality of client computers, the configuration data including parameters that define criteria for identifying sensitive data and trigger events on the client computers;

in response to a notification received from one of the plurality of client computers, monitor data communications of the one of the plurality of client computers for sensitive data by reviewing data communications indicated by the notification; and restrict transmission for a subset of the reviewed data communications in response to detecting sensitive data;

executing a second set of software code on each of the plurality of client computers, the second set of software code causing each of the plurality of client computers to identify other applications, running on the client computer, that access sensitive data matching the criteria indicated by the configuration data;

monitor actions of the other applications identified as accessing sensitive data;

determine whether or not one of the trigger events, defined by the configuration data, has occurred as a function of a sensitivity level of the sensitive data and the monitored actions; and transmit, in response to determining that the trigger event has occurred, the notification to the central server, further including using security databases as a reference for identifying sensitive data, wherein the databases include keywords, locations, document types, specific content and heuristic signatures to assess and determine a risk level.

21. A method for control of sensitive data in a computer system that includes at least one central server communicatively-coupled to a plurality of client computers, the method comprising:

executing a first set of software code on the at least one central server, the first set of software code causing the at least one central server to provide configuration data to each of the plurality of client computers, the configuration data including parameters that define criteria for identifying sensitive data and trigger events on the client computers;

in response to a notification received from one of the plurality of client computers, monitor data communications of the one of the plurality of client computers for sensitive data by reviewing data communications indicated by the notification; and restrict transmission for a subset of the reviewed data communications in response to detecting sensitive data;

executing a second set of software code on each of the plurality of client computers, the second set of software code causing each of the plurality of client computers to identify other applications, running on the client computer, that access sensitive data matching the criteria indicated by the configuration data;

monitor actions of the other applications identified as accessing sensitive data;

determine whether or not one of the trigger events, defined by the configuration data, has occurred as a function of a sensitivity level of the sensitive data and the monitored actions; and transmit, in response to determining that the trigger event has occurred, the notification to the central server, wherein the first set of software code is further configured to cause the at least one central server to:

determine ones of the data communications that are higher-risk, based on a respective number of trigger events associated with each of the data communications in the notification and a sensitivity level of each data communication indicated in the notification, where a higher number of trigger events indicates higher risk and higher sensitivity level indicates higher risk; and prevent transmission data communications determined to be high-risk unless the data communications are encrypted.

22. A security system comprising:

a plurality of client computers;

at least one central server coupled to the plurality of client computers and configured to:

provide configuration data to each of the plurality of client computers, the configuration data including parameters that define criteria for identifying sensitive data and trigger events on the client computers;

in response to a notification received from one of the plurality of client computers, monitor data communications of the one of the plurality of client computers for sensitive data by reviewing data communications indicated by the notification; and restrict transmission for a subset of the reviewed data communications in response to detecting sensitive data; and wherein each of the plurality of client computers is configured and arranged to
identify other applications, running on the client computer, that access sensitive data matching the criteria indicated by the configuration data;
monitor actions of the other applications;
determine whether or not one of the trigger events, defined by the configuration data, has occurred as a function of a sensitivity level of the sensitive data and the monitored actions; and
transmit, in response to determining that the trigger event has occurred, the notification to the central server, wherein
the notification to the central server includes sensitive data tagged with information about one or more of the trigger events, the monitored actions, and the identified other applications; and
the at least one central server is configured to
for each of the monitored data communications, assign a scanning priority based on access permissions of the monitored data communication that are indicated in the notification, where data communication of publically available files are assigned a low scanning priority and data communication of restricted files are assigned a high scanning priority; and
scan the data communications as a function of the assigned scanning priority.

* * * * *